United States Patent
Frederiksen et al.

(10) Patent No.: US 8,072,929 B2
(45) Date of Patent: Dec. 6, 2011

(54) METHOD, APPARATUS, SOFTWARE AND SYSTEM FOR HANDLING INTERCELL INTERFERENCE

(75) Inventors: Frank Frederiksen, Klarup (DK); Troels Emil Kolding, Klarup (DK)

(73) Assignee: Amosmet Investments LLC, Dover, DE (US)

( * ) Notice: Subject to any disclaimer, the term of this patent is extended or adjusted under 35 U.S.C. 154(b) by 579 days.

(21) Appl. No.: 11/649,713

(22) Filed: Jan. 3, 2007

(65) Prior Publication Data

US 2007/0153735 A1 Jul. 5, 2007

Related U.S. Application Data

(60) Provisional application No. 60/756,119, filed on Jan. 3, 2006.

(51) Int. Cl.
*H04W 4/00* (2009.01)
(52) U.S. Cl. ......... 370/329; 455/450; 455/446; 370/335
(58) Field of Classification Search .................. 370/208, 370/335, 344, 329, 331; 455/450, 446
See application file for complete search history.

(56) References Cited

U.S. PATENT DOCUMENTS

| | | | | |
|---|---|---|---|---|
| 2002/0154621 A1* | 10/2002 | Laroia et al. | ........... | 370/347 |
| 2003/0007476 A1* | 1/2003 | Kim et al. | ........... | 370/342 |
| 2005/0096061 A1* | 5/2005 | Ji et al. | ........... | 455/450 |
| 2006/0209754 A1* | 9/2006 | Ji et al. | ........... | 370/329 |
| 2007/0201503 A1* | 8/2007 | Nishio | ........... | 370/437 |
| 2007/0286066 A1* | 12/2007 | Zhang et al. | ........... | 370/208 |
| 2008/0187136 A1* | 8/2008 | Zhang et al. | ........... | 380/270 |

FOREIGN PATENT DOCUMENTS

EP  1 557 968 A1  7/2005
EP  1 583 272 A1  10/2005

OTHER PUBLICATIONS

L. Cai et al, "Improved HARQ Scheme Using Channel Quality Feedback for OFDM Systems", pub. Vehicular Technology Conference, 2004; IEEE 59th vol. 4, May 17-19, 2004, pp. 1869-1872.

* cited by examiner

*Primary Examiner* — Kamran Afshar
*Assistant Examiner* — Shahriar Behnamian
(74) *Attorney, Agent, or Firm* — Knobbe Martens Olson & Bear, LLP

(57) ABSTRACT

A method of handling intercell interference applies physical layer (L1) scheduling decisions to ensure that L1 hybrid automatic repeat request (H-ARQ) retransmissions will not experience the same interference conditions. The retransmission is scheduled in a sub-frame portion that does not include previously tracked allocations of a plurality of users. Potential intercell interference is also handled by applying a time-shift of the L1 H-ARQ retransmissions, such that the bit positions impacted by inter-cell interference will change and thus assure a more robust performance.

31 Claims, 6 Drawing Sheets

METHOD, APPARATUS, SOFTWARE AND SYSTEM FOR HANDLING INTERCELL INTERFERENCE

CROSS-REFERENCE TO RELATED APPLICATION

The present invention is based upon and claims priority to Provisional U.S. Patent Application No. 60/756,119 titled "Method for Handling Intercell Interference" which was filed on Jan. 3, 2006.

FIELD OF INVENTION

The present invention relates generally to wireless communication, and more particularly to handling intercell interference.

BACKGROUND OF INVENTION

The telecommunications industry is in the process of developing a new generation of flexible and affordable communications that includes high-speed access while also supporting broadband services. Many features of the third generation mobile telecommunications system have already been established, but many other features have yet to be perfected.

One of the systems within the third generation of mobile communications is the Universal Mobile Telecommunications System (UMTS) which delivers voice, data, multimedia, and wideband information to stationary as well as mobile customers. UMTS is designed to accommodate increased system capacity and data capability. Efficient use of the electromagnetic spectrum is vital in UMTS. It is known that spectrum efficiency can be attained using frequency division duplex (FDD) or using time division duplex (TDD) schemes. Space division duplex (SDD) is a third duplex transmission method used for wireless telecommunications.

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

The UTRAN consists of a set of Radio Network Subsystems 128 (RNS), each of which has geographic coverage of a number of cells 110 (C), as can be seen in FIG. 1. The interface between the subsystems is called Iur.

Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

LTE, or Long Term Evolution (also known as 3.9G), refers to research and development involving the Third Generation Partnership Project (3GPP) aimed at identifying technologies and capabilities that can improve systems such as the UMTS. The present invention is related to LTE work that is taking place in 3GPP.

Generally speaking, a prefix of the letter "E" in upper or lower case may signify LTE, although this rule may have exceptions. The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 2. This example of E-UTRAN consists of eNBs, providing the E-UTRA user plane (RLC/MAC/PHY) and control plane (RRC) protocol terminations towards the UE. The eNBs are interconnected with each other by means of the X2 interface. The eNBs are also connected by means of the SI interface to the EPC (evolved packet core) more specifically to the MME (mobility management entity) and the UPE (user plane entity). The SI interface supports a many-to-many relation between MMEs/UPEs and eNBs. The S1 interface supports a functional split between the MME and the UPE. The MMU/UPE in the example of FIG. 2 is one option for the access gateway (aGW).

In the example of FIG. 2, there exists an X2 interface between the eNBs that need to communicate with each other. For exceptional cases (e.g. inter-PLMN handover), LTE_ACTIVE inter-eNB mobility is supported by means of MME/UPE relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement reporting configuration for mobility and scheduling. The MME/IUPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

The present invention is related to intercell interference in LTE, although the solution of the present invention may also be applicable to present and future systems other than LTE. One possible access technique in LTE for the downlink connection is orthogonal frequency division multiplexing (OFDM), applying different system bandwidths from 1.25 MHz to 20 MHz. OFDM splits the datastream into multiple radio frequency (RF) channels, each of which is sent over a subcarrier frequency. The signal-to-noise ratio of each of those very precisely defined frequencies is carefully monitored to ensure maximum performance.

According to this OFDM approach, the frame structure would divide a frame of 10 ms into a number of sub-frames, each having a duration of 0.5 ms. Each of these sub-frames will consist of a number of OFDM symbols, which will be either 6 or 7. The 7 OFDM symbols per sub-frame will carry unicast transmissions, while the 6OFDM symbols subframe will carry multicast transmissions. However, it should be borne in mind that the multicast/unicast definiton could potentially be altered in the future (e.g. 6 OFDM symbols could be used for unicast transmission).

The present invention is concerned primarily with unicast transmission, but in principle multicast transmission could be addressed in a similar way, especially in the unlikely event that hybrid automatic repeat request (H-ARQ) for multicast is implemented. The current working assumption is that the first OFDM symbol within a sub-frame will hold the essential information to ensure proper operation of a cell (that is, the pilot symbols for proper channel estimation as well as allocation information-which describes the allocation of the physical resources to the different users within the cell). This first OFDM symbol will carry common information as well as shared control information, and in order to ensure that this information is provided to the entire coverage area of the cell, this OFDM symbol has to be transmitted at relatively high power, and will have to be transmitted for every sub-frame. One of several ways to arrange this system is for a transmission time interval (TTI) to consist of a sub-frame pair (1 ms duration), and for the control channel information to be located within the first 3 OFDM symbols (or even less), although many other arrangements are possible (as will be understood by a person skilled in the art).

It is possible for the physical layer (providing access to the radio channel) to provide hybrid automatic repeat request (H-ARQ) to recover from reception errors. This is a well-known technique in modern communications, and will compensate for errors in the radio channel as well as measurement errors in the feed-back loop. Furthermore, it is currently assumed that the Node B's of the network are operating in unsynchronized mode to simplify the network. Hybrid automatic repeat request (H-ARQ) retransmissions should preferably experience a lower amount of interference conditions than is currently possible according to prior art technology.

A problem with the prior art is that the "first OFDM symbol within a sub-frame" from other cells will typically be offset in time relative to the current reception from the serving cell. This means that the interference for a single user or cell will typically be bursty, but periodical and with a constant time offset. Furthermore, when there is more than a single interfering cell, it might be difficult to circumvent the problem in a simple way.

This problem will be most clear in lightly loaded cells, but can also occur whenever (or if) slow power control is applied in the downlink. One case of interest is the case of Voice Over Internet Protocol (VoIP), where many users may be multiplexed. In this case the control symbol—or the first OFDM symbol—needs to be "filled" out to do the addressing, but the required data amount (e.g. maximally 10-15 VoIP packets) will not fill out the other data symbols. Thus, we have some multiplexing freedom available, but the prior art has not exploited that freedom.

When considering the control channel overhead for the situation with many low-data rate users, it is important to keep in mind that the control channel (and the common/broadcast channels) needs to be transmitted all the time. Also, for instance, the synchronization channel and the pilot channel need to be transmitted using quite high power levels in order to assure proper detection by all mobiles within the cell.

SUMMARY OF INVENTION

Potential intercell interference can be at least partially handled by applying physical layer (i.e. L1) scheduling decisions, such that L1 hybrid automatic repeat request (H-ARQ) retransmissions will not experience the same interference conditions. Thus, intercell interference is handled by using link adaptation in conjunction with H-ARQ.

Potential intercell interference can also be at least partially handled by applying a time-shift of the L1 H-ARQ retransmissions, such that the bit positions impacted by inter-cell interference will change and thus assure a more robust performance. Thus, intercell interference is handled by using bit re-mapping in conjunction with H-ARQ.

DETAILED DESCRIPTION OF THE INVENTION

A preferred embodiment of the present invention will now be described. This is merely to illustrate one way of implementing the invention, without limiting the scope or coverage of what is described elsewhere in this application.

Figure 1:
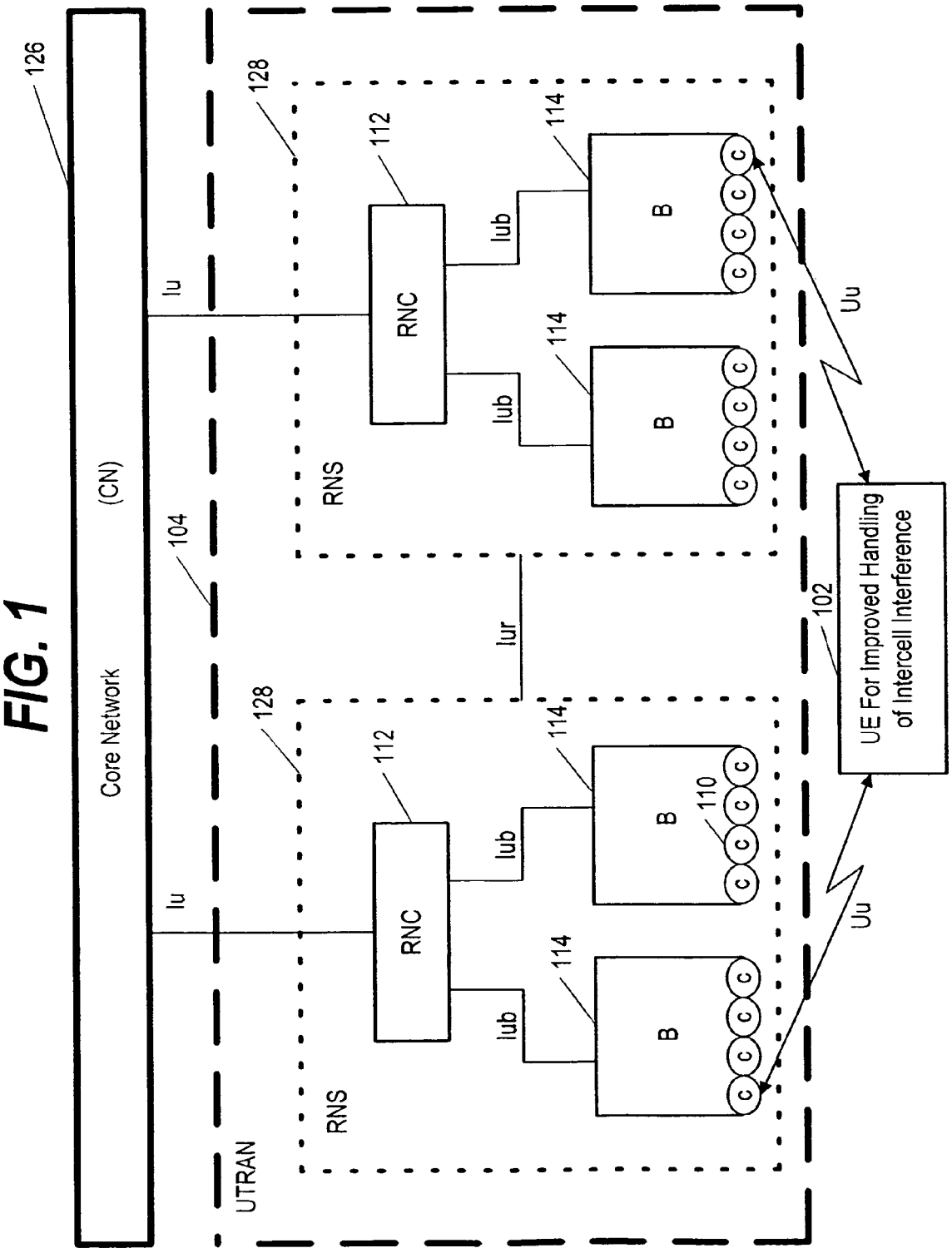
FIG. 1 shows a UTRAN system with a user equipment according to an embodiment of the present invention.
Figure 2:
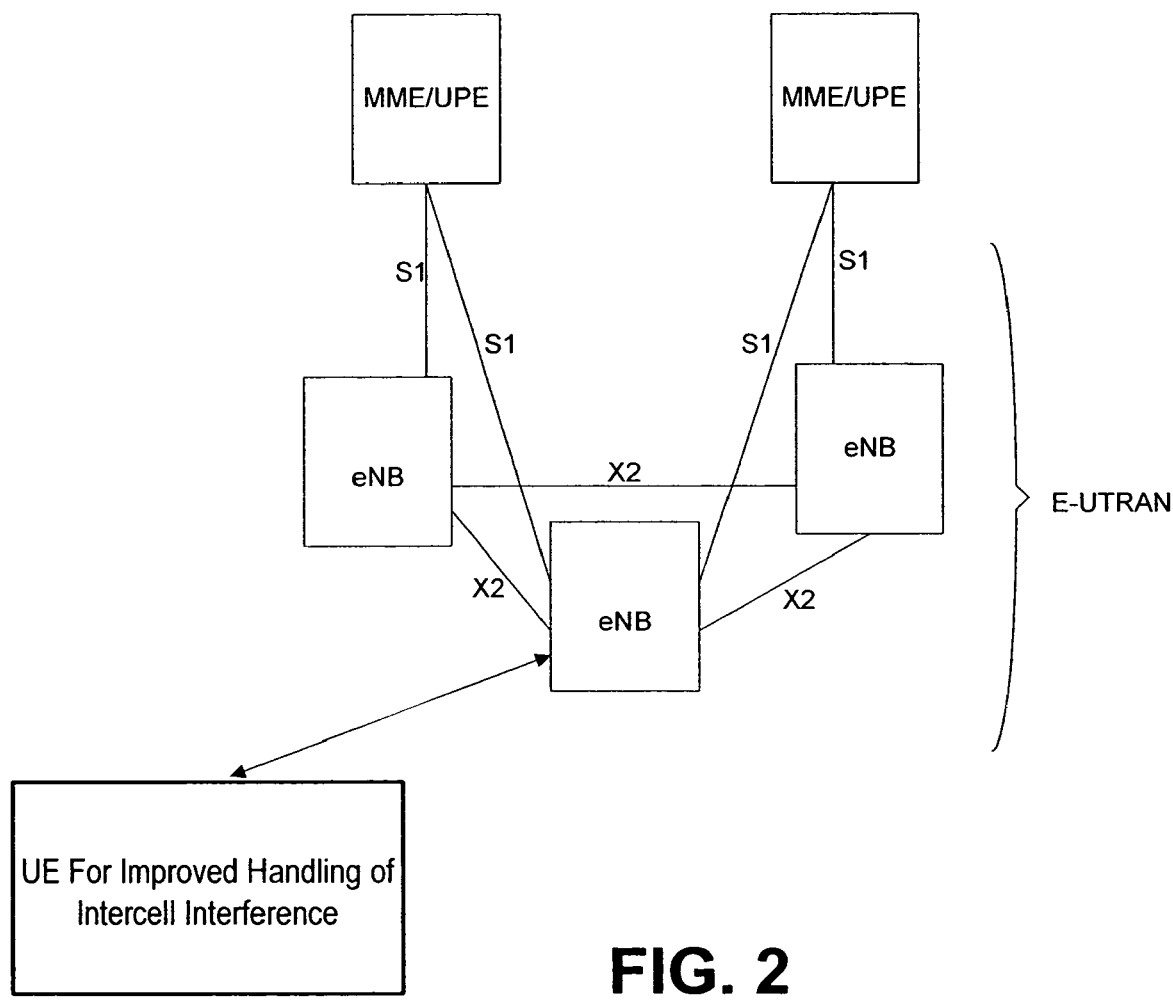
FIG. 2 shows an LTE system with a user equipment according to an embodiment of the present invention.
Figure 3:
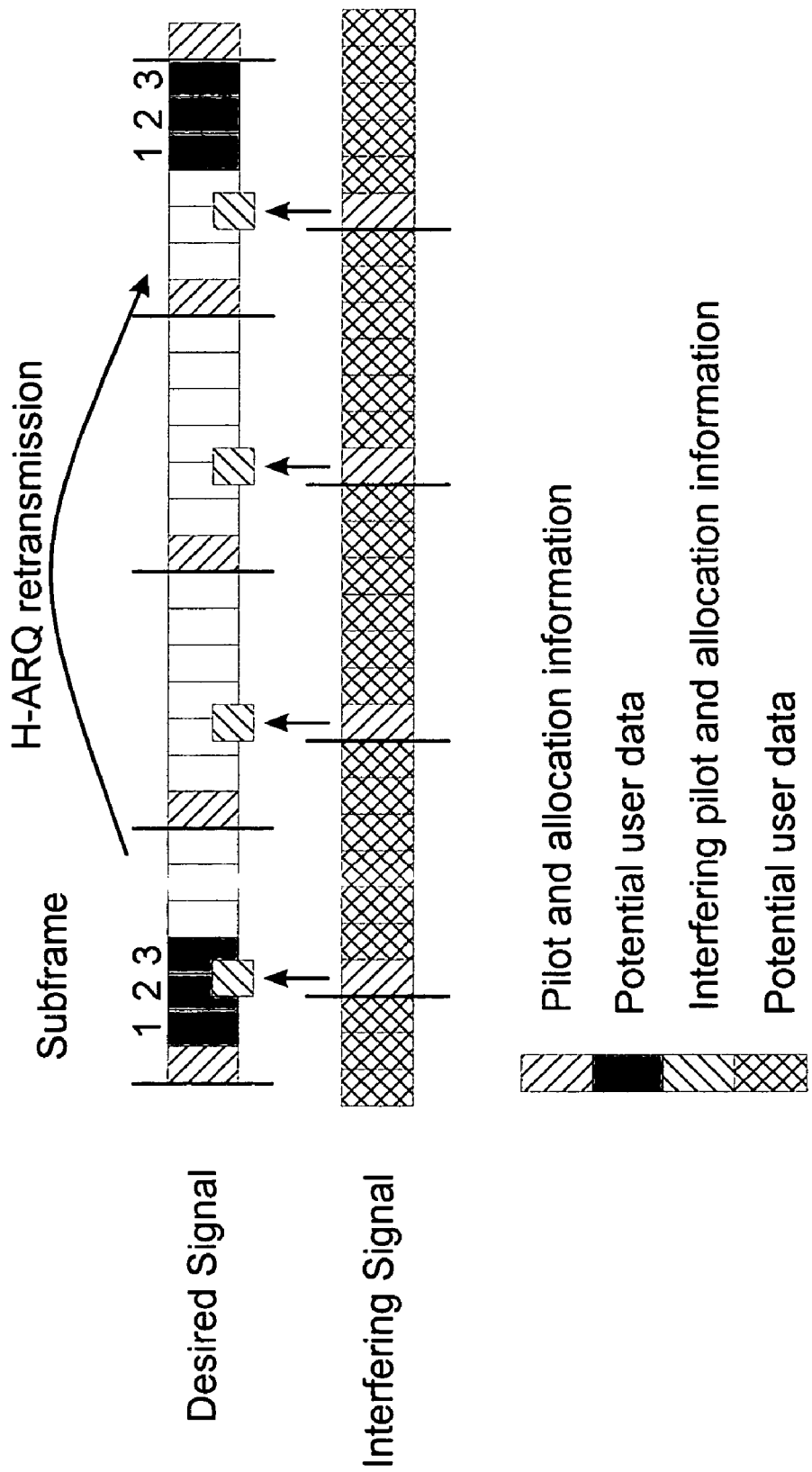
FIG. 3 illustrates the principle of having constant and periodical interference as well as the principle of avoiding using the same time domain part of a sub-frame for a H-ARQ retransmission by using link adaptation.

In order to handle intercell interference by using link adaptation in conjunction with H-ARQ, a tracking mechanism is provided in the L1 packet scheduler, which keeps track of the time and frequency allocations for all users. If a retransmission is requested, e.g. because the first transmission failed, the packet scheduler and link adaptation takes the original allocations into account, and preferably schedules the user in a different part (in the time domain) of the sub-frame (e.g. see FIG. 3 for an example). The present invention takes advantage of available multiplexing freedom in order to conduct smart scheduling cross-optimized with H-ARQ.

The advantage of applying a L1 scheduling decision in this way is that the H-ARQ functionality will become more robust towards constant and periodical interference situations. Although the invention only provides gain when 3 OFDM symbols or less are allocated to a user, sub-optimum algorithms could be developed for this situation. The present invention assumes flexible multiplexing freedom in time as well as frequency multiplexing (e.g. that time multiplexing can be combined with frequency multiplexing).

In order to handle intercell interference by using bit re-mapping in conjunction with H-ARQ, the present invention includes a method of providing H-ARQ retransmissions such that the subparts of a data message transmitted in a single OFDM symbol are not transmitted in the same OFDM symbol for a subsequent retransmission. The offset for a retransmission would have to be at least 2 OFDM symbols to assure that the same subpart of the message is not interfered once more. This handling of offsets would have to be handled in a way known by the Node B as well as by the UE (e.g. part of the standardized specifications). The basic concept is illustrated in FIG. 4.

Figure 4:
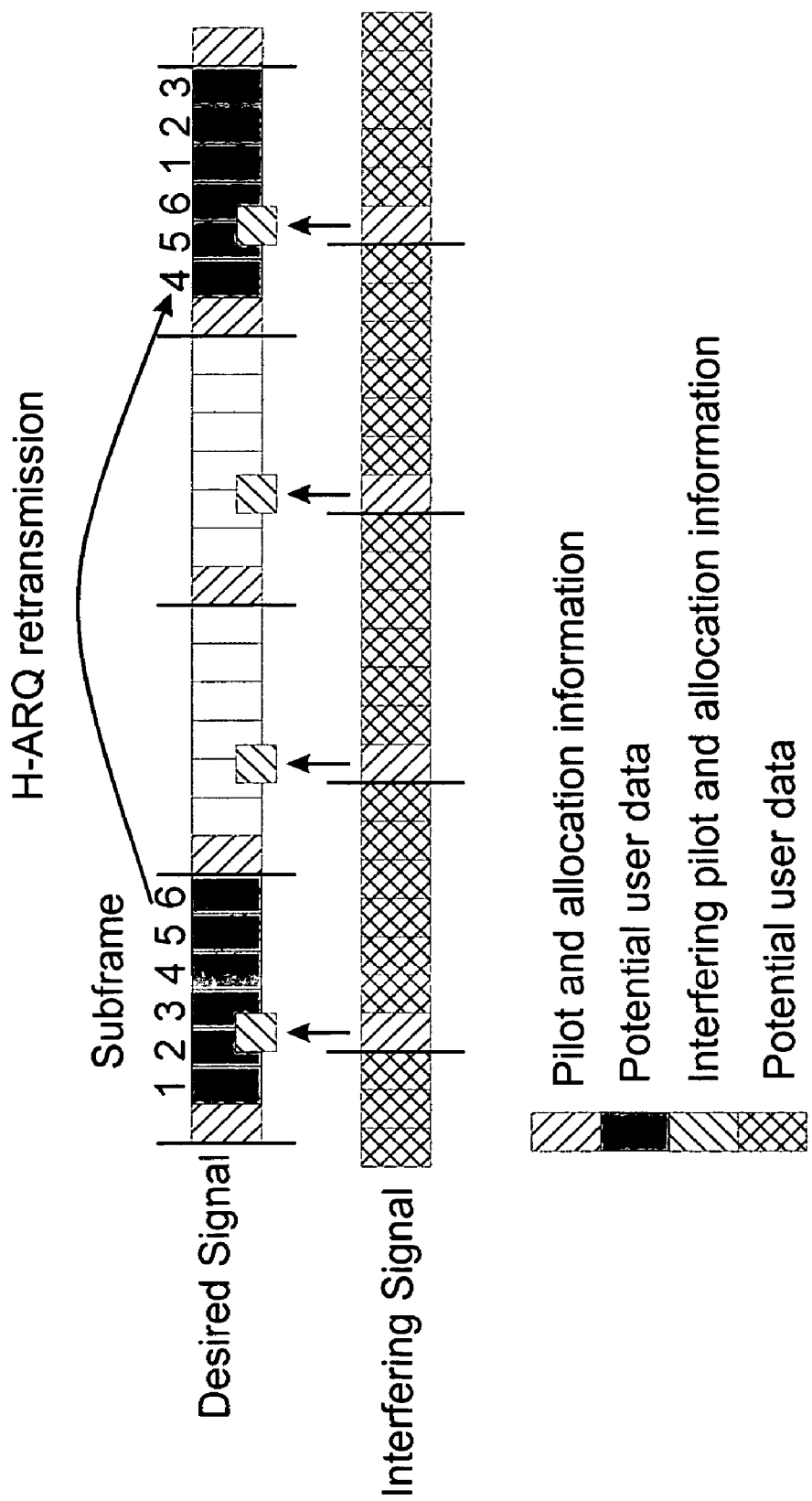
FIG. 4 illustrates the principle of having the pilot channel and shared control information from other cells acting as interference. Furthermore, it is shown how a H-ARQ retransmission would apply a time shift in order to reduce the impact of the interference.

The current setup is such that allocation tables and system information is mostly contained in a single symbol range (the "pilot and allocation information" symbol shown in FIG. 4). Other cells are not time-synchronous, and therefore system information in different cells is not seen simultaneously in the cell considered here. However, since all cells use the same overall timing, the interference from any other cell will happen at the same time instance within each sub-frame (illustrated by the "interfering pilot and allocation information" box in FIG. 4). If retransmitting in the same position, it is assumed that there should be a signalling bit for H-ARQ retransmissions telling the UE which time-shifting algorithm to use (2-3 levels would provide enough flexibility for the H-ARQ retransmissions). The reason that we need signalling information is that we might end up in the situation that the full time span (all 6 user data symbols in FIG. 4) is used for user data, and thus we need a method for providing the averaging. The primary operational functionality of this feature would be to provide the option of "relocating" the position of a primary interference source, thus providing an averaging effect by shifting the user data sequence.

Although the downlink direction has been discussed thus far, the same principle could be applied for the uplink—especially when considering the situation where there is semi-static allocation of user resources. In this case, we are very dependent on H-ARQ to obtain a high spectral efficiency, and this approach would provide an interference averaging mechanism, which would potentially improve the H-ARQ performance.

The advantage of handling intercell interference by using bit re-mapping in conjunction with H-ARQ would be that the H-ARQ retransmissions would potentially gain more robustness, but the disadvantage would be that extra signaling is required on the shared control channel. Signaling overhead could be alleviated provided that time-shifting is always assumed in the first re-transmission when more OFDM symbols have been allocated to the same user.

Figure 5:
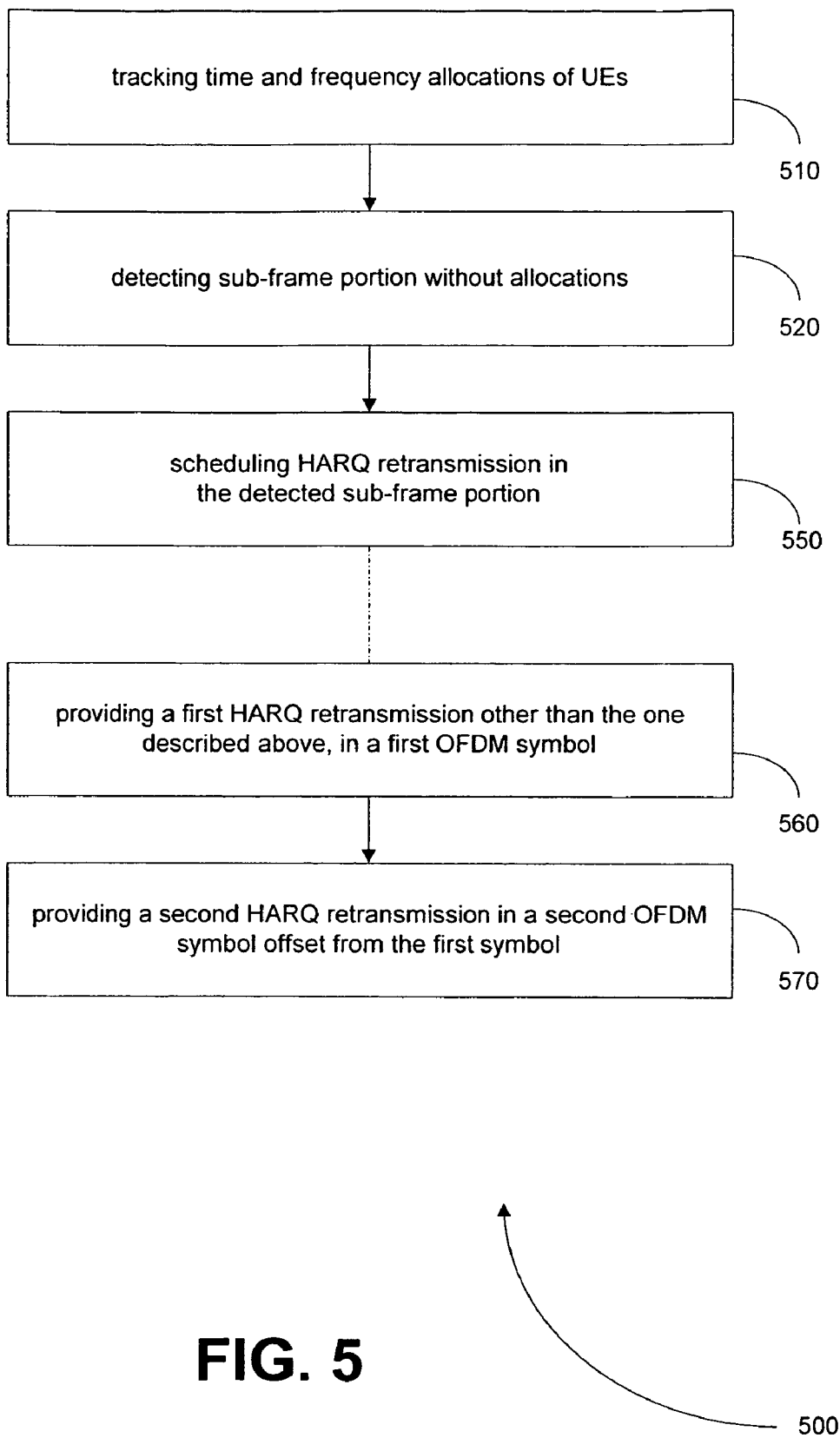
FIG. 5 is a flow chart illustrating a method according to an embodiment of the present invention.

FIG. 5 illustrates a method 500 according to an embodiment of the invention. Time and frequency allocations of a plurality of user equipments are tracked 510. Then, a sub-frame portion without allocations is detected 520. A HARQ retransmission is scheduled 550 in the detected sub-frame portion.

In accordance with FIG. 5, a first HARQ retransmission is provided 560 in a first OFDM symbol. Then, a second HARQ retransmission is provided 570 in a second OFDM symbol that is offset from the first OFDM symbol. In this embodiment, a network element is capable of performing either 510-550 or 560-570, and will do so as necessary to reduce inter-cell interference. A person skilled in the art will understand that 510-550 can be implemented together with 560-570 in a single method, or they can be implemented independently (hence the broken line connecting 550 to 560.

Figure 6:
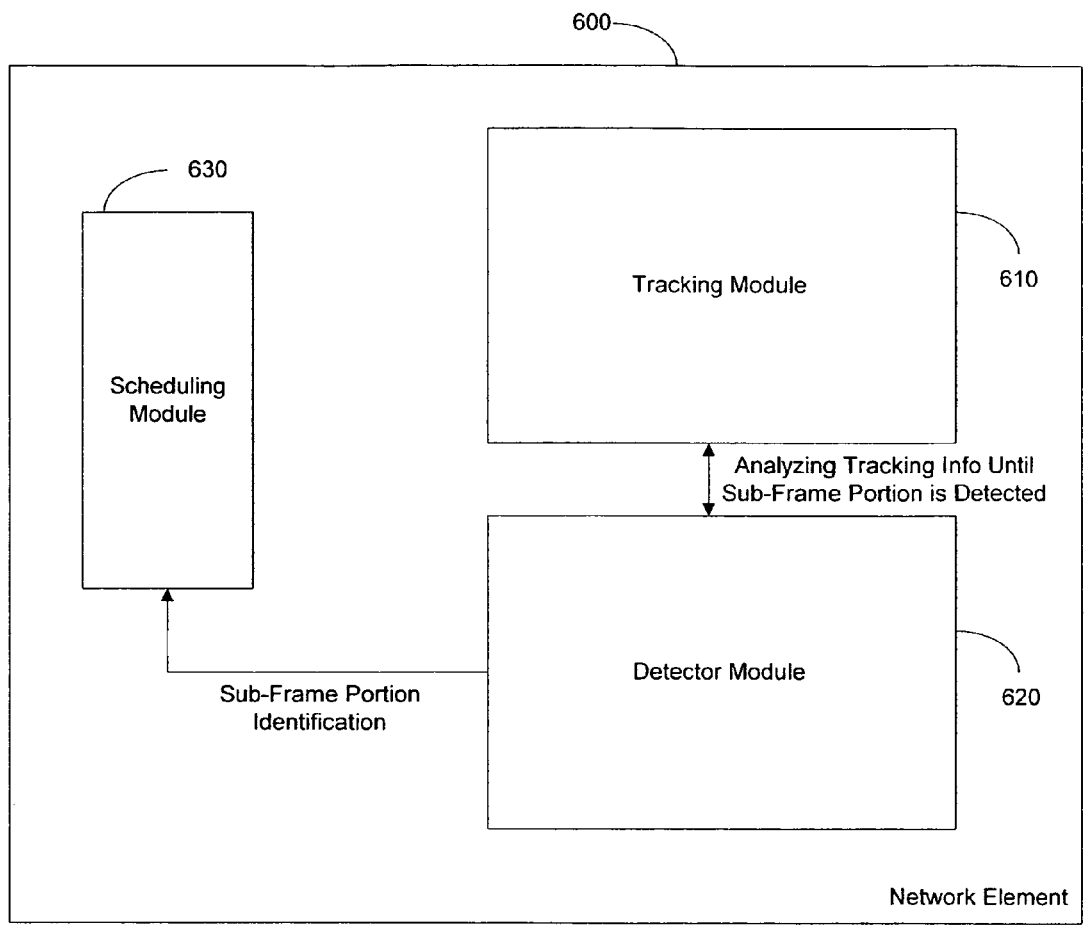
FIG. 6 is a block diagram of an apparatus according to an embodiment of the present invention.

Turning now to FIG. 6, a network element 600 according to an embodiment of the invention is shown. Tracking module 610 will track time and frequency allocations of user equipments. Detector module 620 will use that tracking information to seek out a sub-frame portion that does not include any of the allocations. Then the scheduling module 630 will schedule a HARQ retransmission in the detected sub-frame portion.

The embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor comprising a single processing unit, multiple processing units capable of parallel operation, or the CPU can be distributed across one or more processing units in one or more locations, e.g., on a client and server. A memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms. Of course, a memory unit may reside (e.g.) in the tracking module 610 in order to store tracking information.

It is to be understood that the present figures, and the accompanying narrative discussions of best mode embodiments, do not purport to be completely rigorous treatments of the method, system, mobile device, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
   identifying, for a first user equipment, a first set of one or more symbol positions within a first sub-frame in a first transmission, wherein the first transmission is associated with time and frequency allocations of a plurality of user equipment;
   identifying a second set of one or more symbol positions within the first sub-frame that are different from the first set of one or more symbol positions and that are available;
   identifying a shift in the first set of symbol positions of the first sub-frame; and
   scheduling a physical layer hybrid automatic repeat request retransmission of data provided in the first transmission for the first user equipment in the identified second set of one or more symbol positions within a second sub-frame so that any data transmitted in a last symbol position of the first sub-frame is retransmitted in the second sub-frame prior to retransmission of any data in a first symbol position of the first sub-frame,
   wherein all of the data transmitted in the first sub-frame is retransmitted in the second sub-frame, and
   wherein identifying the shift results in the data of the first sub-frame being assigned to at least one symbol position of the second sub-frame which was not assigned in the first sub-frame.

2. The method as recited in claim 1, wherein said scheduling is performed responsive to interference associated with the first transmission of the data in the first set of symbol positions.

3. The method as recited in claim 1, wherein the first user equipment is using a voice over internet protocol, wherein the retransmission is scheduled on a downlink from a network to the first user equipment by employing orthogonal frequency division multiplexing, and wherein the scheduling is selected to reduce intercell interference.

4. The method as recited in claim 1, wherein the method is used only in response to a retransmission request, and wherein one or more different methods are used to process substantially all other transmissions to the user equipment.

5. The method as recited in claim 1, wherein identifying the second set of one or more available symbol positions comprises selecting the second set of one or more available symbol positions to reduce intercell interference.

6. The method of claim 1, wherein data of the first symbol position in the first sub-frame is originally transmitted prior to data in a last symbol position of the first sub-frame.

7. A method for scheduling a HARQ retransmission of data previously transmitted in one or more sub-frames over a channel, the method comprising:
transmitting data in one or more sub-frames over a channel, wherein each sub-frame is associated with an assigned set of symbol positions for transmitting symbols;
identifying a shift in the assigned set of symbol positions in a first sub-frame; and
scheduling a HARQ retransmission of data of the first sub-frame in a second sub-frame according to the identified shift so that the data transmitted in a first symbol position of the first sub-frame is retransmitted in a second symbol position of the second sub-frame and any data transmitted in a last symbol position of the first sub-frame is retransmitted in a first symbol position of the second sub-frame prior to retransmission of the data in the first symbol position of the first sub-frame,
wherein identifying the shift results in the data of the first sub-frame being assigned to symbol positions of the second sub-frame which were not assigned in the first sub-frame.

8. The method of claim 7, wherein the data of the first symbol position of the first sub-frame is originally transmitted prior to any data of a second symbol position of the first sub-frame and prior to any data of a last symbol position of the first sub-frame.

9. The method of claim 7, wherein the data of the first symbol position of the first sub-frame is originally transmitted prior to any other data of the first sub-frame.

10. The method as recited in claim 7, wherein the method is used only in response to a retransmission request, and wherein one or more different methods are used to process substantially all other transmissions to user equipment.

11. The method as recited in claim 7, wherein identifying the shift comprises identifying the shift to reduce intercell interference.

12. The method as recited in claim 7, wherein the shift comprises at least two orthogonal frequency division multiplexing symbol positions.

13. The method as recited in claim 7, wherein the shift is known to both a user equipment which receives the HARQ retransmission and to a network element which provides the HARQ retransmission.

14. A network element comprising:
means for identifying, for a first user equipment, a first set of one or more time slots of a first sub-frame in a first transmission, wherein the first transmission is associated with time and frequency allocations of a plurality of user equipment;
means for identifying a second set of one or more available time slots of the first sub-frame that are different from the first set of one or more time slots;
means for identifying a shift in the first set of the first sub-frame; and
means for scheduling a physical layer hybrid automatic repeat request retransmission of the data provided in the first transmission for the first user equipment in the identified second set of one or more available time slots in a second sub-frame so that any data transmitted in a last time slot of the first sub-frame is retransmitted in the second sub-frame prior to retransmission of any data in a first time slot of the first sub-frame,
wherein all of the data transmitted in the first sub-frame is retransmitted in the second sub-frame, and
wherein the means for identifying the shift assigns the data of the first sub-frame to time slots of the second sub-frame which were not assigned in the first sub-frame.

15. The network element as recited in claim 14, wherein said scheduling is performed responsive to interference associated with the first transmission of the data in the first set of time slots.

16. The network element as recited in claim 14, wherein the first user equipment is using a voice over internet protocol, wherein the retransmission is scheduled on a downlink from a network to the first user equipment by employing orthogonal frequency division multiplexing, and wherein the scheduling is selected to reduce intercell interference.

17. The network element as recited in claim 14, wherein the means for identifying the second set of one or more available time slots comprises means for selecting the second set of one or more available time slots to reduce intercell interference.

18. A network element for scheduling a HARQ retransmission of data previously transmitted in one or more sub-frames over a channel, the network element comprising:
means for transmitting data in one or more sub-frames over a channel, wherein each sub-frame is associated with an assigned set of symbol positions for transmitting symbols;
means for identifying a shift in the assigned set of symbol positions in a first sub-frame; and
means for scheduling a HARQ retransmission of data of the first sub-frame in a second sub-frame according to the identified shift so that any data transmitted in a first symbol position of the first sub-frame is retransmitted in a second symbol position of the second sub-frame and any data transmitted in a third symbol position of the first sub-frame is retransmitted in a first symbol position of the second sub-frame prior to retransmission of the data in the first symbol position of the first sub-frame,
wherein the means for identifying the shift assigns the data of the first sub-frame to symbol positions of the second sub-frame which were not assigned in the first sub-frame.

19. The network element as recited in claim 18, wherein the means for identifying the shift comprises means for identifying the shift to reduce intercell interference.

20. The network element as recited in claim 18, wherein the shift comprises at least two orthogonal frequency division multiplexing symbol positions.

21. The network element as recited in claim 18, wherein the shift is known to both a user equipment which receives the HARQ retransmission and to a network element which provides the HARQ retransmission.

22. A network element comprising:
a tracking module configured to identify, for a first user equipment, a first set of one or more time slots of a first sub-frame in a first transmission, wherein the first transmission is associated with time and frequency allocations of a plurality of user equipment;
a detector module configured to identify a second set of one or more available time slots of the first sub-frame that are different from the first set of one or more time slots and further configured to identify a shift in the first set of time slots; and
a scheduling module configured to schedule a physical layer hybrid automatic repeat request retransmission of the data provided in the first transmission for the first user equipment in the identified second set of one or more available time slots of a second sub-frame so that any data transmitted in a last time slot of the first subframe is retransmitted in the second sub-frame prior to retransmission of any data in a first time slot of the first sub-frame, wherein all of the data transmitted in the first sub-frame is retransmitted in the second sub-frame, and wherein identifying the shift results in at least a portion of the data of the first sub-frame being assigned to at least one time slot of the second sub-frame which was not assigned in the first sub-frame.

23. The network element as recited in claim 22, wherein said scheduling module is configured to schedule the physical layer hybrid automatic repeat request retransmission in response to interference associated with the first transmission of the data in the first set of time slots.

24. The network element as recited in claim 22, wherein the first user equipment is using a voice over internet protocol, wherein the retransmission is scheduled on a downlink from a network to the first user equipment by employing orthogonal frequency division multiplexing, and wherein the scheduling is selected to reduce intercell interference.

25. A network element for scheduling a HARQ retransmission of data previously transmitted in one or more sub-frames over a channel, the network element comprising:

a transmission module configured to transmit data in one or more sub-frames over a channel, wherein each sub-frame is associated with an assigned set of symbol positions for transmitting symbols;

an offset module configured to identify a shift in the assigned set of symbol positions in a first sub-frame; and a scheduling module configured to schedule a HARQ retransmission of data of the first sub-frame in a second sub-frame according to the identified shift so that any data transmitted in a first symbol position of the first sub-frame is retransmitted in a second symbol position of the second sub-frame and any data transmitted in a third symbol position of the first sub-frame is retransmitted in a first symbol position of the second sub-frame prior to retransmission of the data in the first symbol position of the first sub-frame, wherein identifying the shift results in at least a portion of the data of the first sub-frame being assigned to at least one symbol position of the second sub-frame which was not assigned in the first sub-frame.

26. The network element as recited in claim 25, wherein the shift comprises at least two orthogonal frequency division multiplexing symbol positions.

27. A software computer program product comprising a non-transitory computer readable storage medium having executable codes embedded therein; the codes, if executed, are adapted to carry out the functions of:

identifying, for a first user equipment, a first set of one or more time slots of a first sub-frame in a first transmission, wherein the first transmission is associated with time and frequency allocations of a plurality of user equipment;

identifying a second set of one or more available time slots of the first sub-frame that are different from the first set of one or more time slots;

identifying a shift in the first set of time slots; and scheduling a physical layer hybrid automatic repeat request retransmission of the data provided in the first transmission for the first user equipment in the identified second set of one or more available time slots of a second sub-frame so that any data transmitted in a last time slot of the first sub-frame is retransmitted in the second sub-frame prior to retransmission of any data in a first time slot of the first sub-frame, wherein all of the data transmitted in the first sub-frame is retransmitted in the second sub-frame, and wherein identifying the shift results in at least a portion of the data of the first sub-frame being assigned to at least one time slot of the second sub-frame which was not assigned in the first sub-frame.

28. The software computer program product as recited in claim 27, wherein said scheduling is performed responsive to interference associated with the first transmission of the data in the first set of time slots.

29. A mobile device for scheduling a HARQ retransmission of data previously transmitted in one or more sub-frames over a channel, the mobile device comprising:

means for transmitting data in one or more sub-frames over a channel, wherein each sub-frame is associated with an assigned set of symbol positions for transmitting symbols;

means for identifying a shift in the assigned symbol positions in the first sub-frame; and means for scheduling a HARQ retransmission of data of the first sub-frame in a second sub-frame according to the identified shift so that any data transmitted in a first symbol position of the first sub-frame is retransmitted in a second symbol position of the second sub-frame and any data transmitted in a third symbol position of the first sub-frame is retransmitted in a first symbol position of the second sub-frame prior to retransmission of the data in the first symbol position of the first sub-frame, wherein the means for identifying the shift assigns at least a portion of the data of the first sub-frame to at least one symbol position of the second sub-frame which was not assigned in the first sub-frame.

30. The mobile device as recited in claim 29, wherein the means for identifying the shift comprises means for identifying the shift to reduce intercell interference.

31. The mobile device as recited in claim 29, wherein the shift comprises at least two orthogonal frequency division multiplexing symbol positions.

* * * * *

UNITED STATES PATENT AND TRADEMARK OFFICE
CERTIFICATE OF CORRECTION

| | | |
|---|---|---|
| PATENT NO. | : 8,072,929 B2 | Page 1 of 1 |
| APPLICATION NO. | : 11/649713 | |
| DATED | : December 6, 2011 | |
| INVENTOR(S) | : Frederiksen et al. | |

It is certified that error appears in the above-identified patent and that said Letters Patent is hereby corrected as shown below:

IN THE SPECIFICATIONS:
In Column 1, Line 45, delete "(RNS)," and insert -- (RNSs), --, therefor.

In Column 1, Line 47, delete "lur." and insert -- Iur. --, therefor.

In Column 1, Line 53, delete "lub" and insert -- Iub --, therefor.

In Column 2, Line 36, delete "MME/IUPE" and insert -- MME/UPE --, therefor.

In Column 2, Line 59, delete "6OFDM" and insert -- 6 OFDM --, therefor.

In Column 2, Line 61, delete "definiton" and insert -- definition --, therefor.

In Column 3, Line 5, delete "information-which" and insert -- information which --, therefor.

In Column 3, Line 44, delete "10-15VoIP" and insert -- 10-15 VoIP --, therefor.

In Column 5, Line 47, delete "560." and insert -- 560). --, therefor.

IN THE CLAIMS:
In Column 7, Line 56, in Claim 14, delete "set of the first" and insert -- set of time slots of the first --, therefor.

Signed and Sealed this
Fifth Day of June, 2012

David J. Kappos
*Director of the United States Patent and Trademark Office*